Dec. 20, 1966          K. M. MOORE          3,292,490
PHOTOGRAPHING EQUIPMENT
Filed Sept. 4, 1964          2 Sheets-Sheet 1
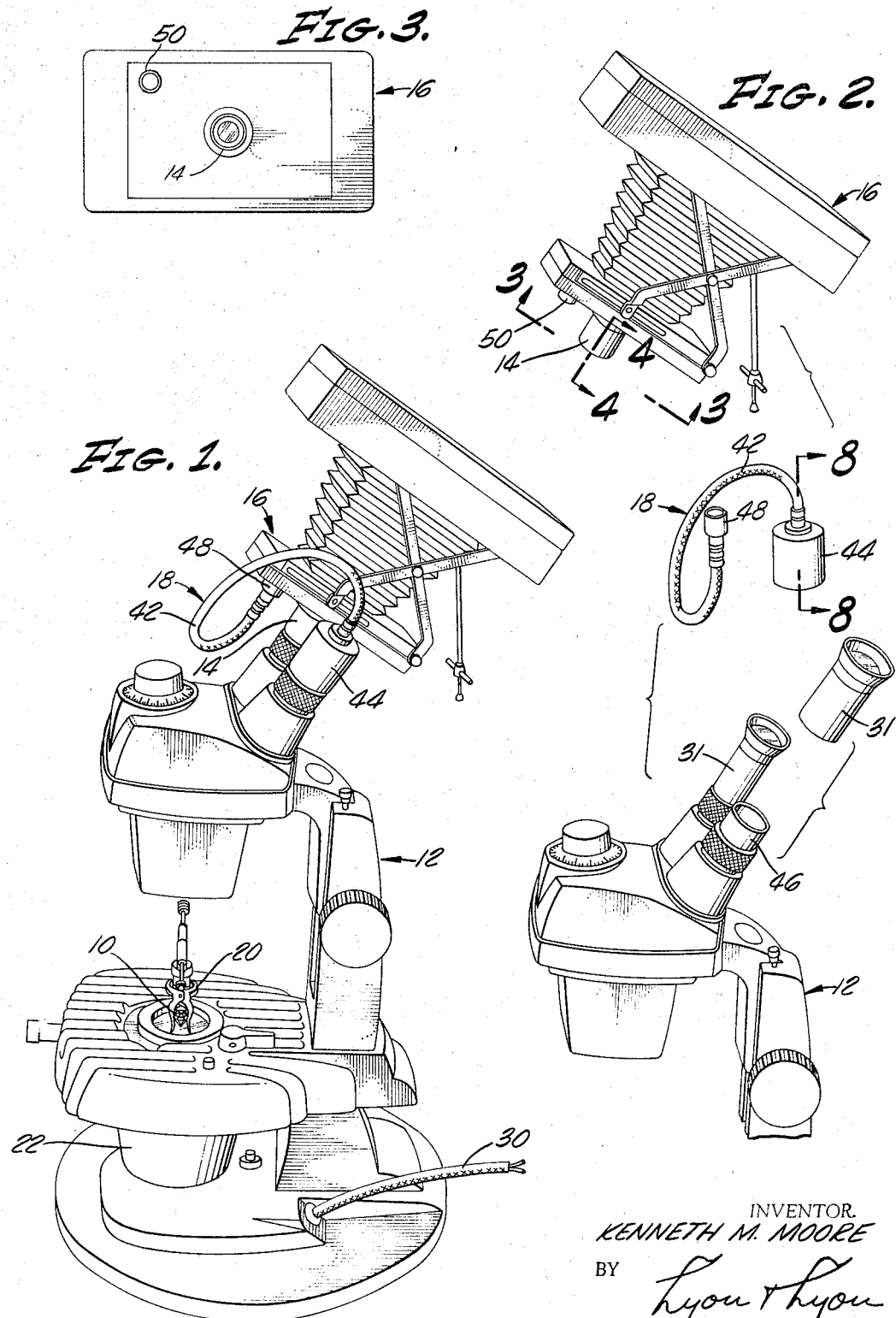
INVENTOR.
KENNETH M. MOORE
BY
Lyon & Lyon
ATTORNEYS Dec. 20, 1966 K. M. MOORE 3,292,490
PHOTOGRAPHING EQUIPMENT
Filed Sept. 4, 1964 2 Sheets-Sheet 2
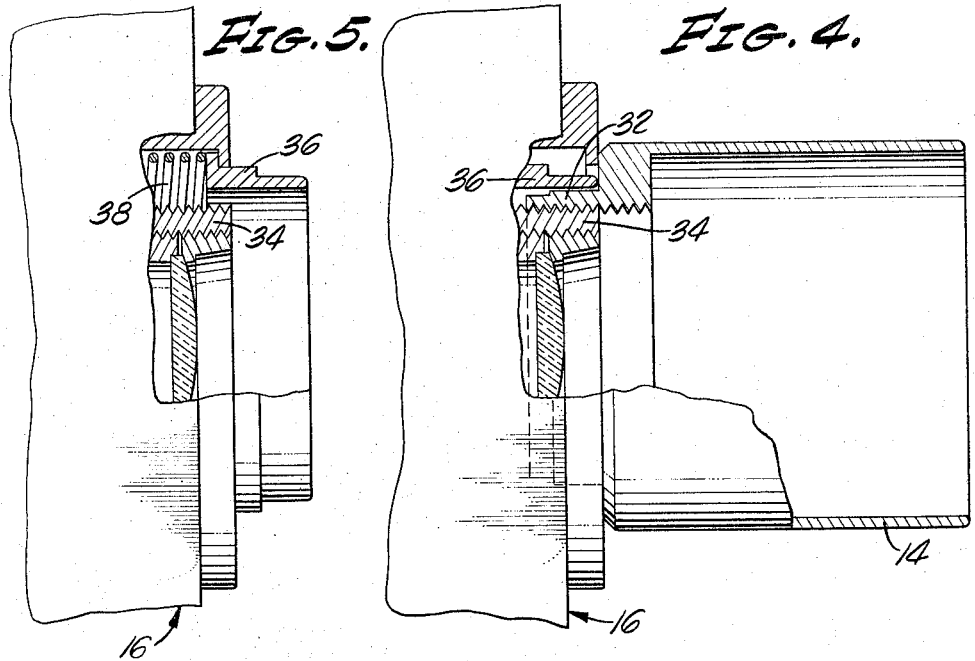
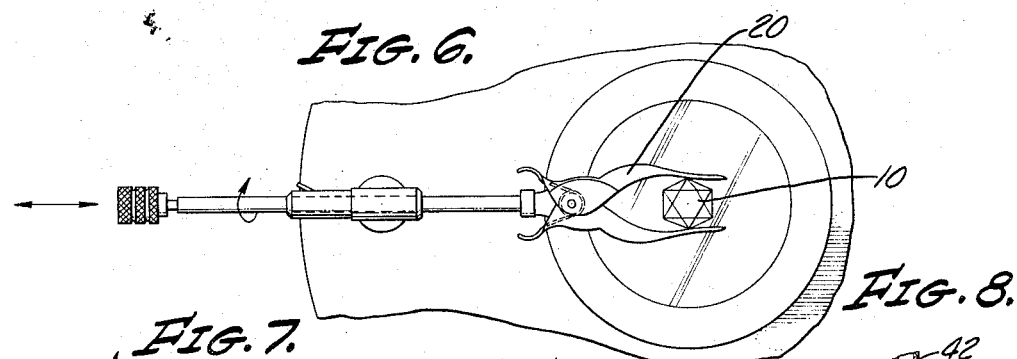
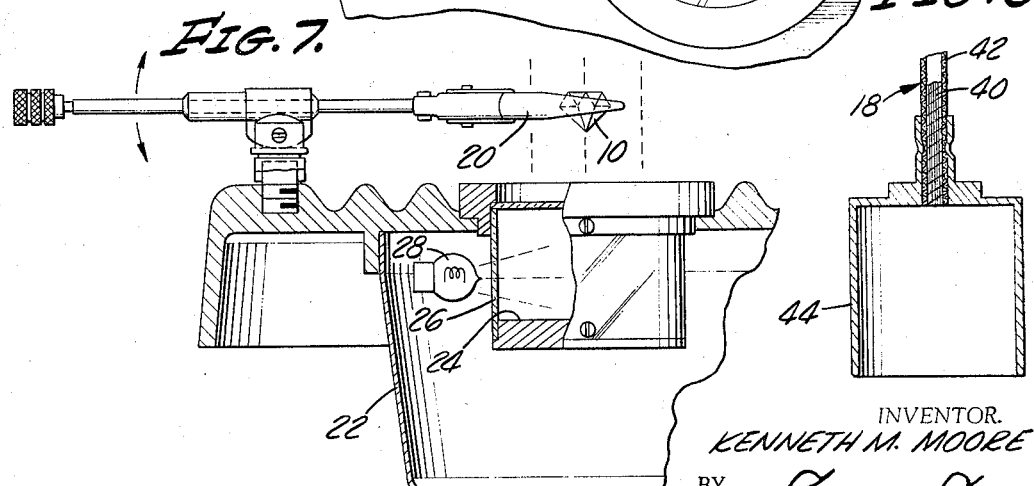
INVENTOR.
KENNETH M. MOORE
BY Lyon & Lyon
ATTORNEYS

3,292,490
PHOTOGRAPHING EQUIPMENT

Kenneth M. Moore, Granada Hills, Calif., assignor to Gemological Institute of America, Los Angeles, Calif., a corporation of Ohio
Filed Sept. 4, 1964, Ser. No. 394,487
2 Claims. (Cl. 88—24)

This invention relates to improved photographing equipment.

It is an object of this invention to provide a structure wherein an object to be photographed can be magnified prior thereto and a camera having an automatic shutter operated by a light-responsive means, such as a photoelectric cell, is utilized for photographing.

A further object is to provide a structure for producing photographs of an object wherein the object is magnified, extremely sharply focused, and properly illuminated before photographing.

While the invention hereinafter described in the preferred embodiment is particularly adapted to the photographing of gems, it is readily adaptable to many other uses.

Other objects and advantages will be readily apparent from the following description:

In the drawings:

FIGURE 1 is a perspective view of the photographing equipment;

FIGURE 2 is a diagrammatic view of some of the components;

FIGURE 3 is a view taken along line 3—3 of FIGURE 2;

FIGURE 4 is a view taken along line 4—4 of FIGURE 2;

FIGURE 5 is a view similar to FIGURE 4 with the adapter removed.

FIGURE 6 is a plan view illustrating support of the object to be photographed;

FIGURE 7 is a fragmentary side elevation in section illustrating illumination of the object to be photographed; and FIGURE 8 is a view taken along line 8—8 of FIGURE 2.

Referring first to FIGURE 1, the object 10 to be magnified and photographed (in this instance a gem) is supported above an illuminated field on a binocular microscope 12. Microscopes of this type are well known to those skilled in are art so that only those details important hereto will be described in detail.

Mounted over one eyepiece of the microscope is a camera adapter 14 which receives the lens of camera 16. The camera is of any construction well known to those skilled in the art having an automatic shutter operated from a photoelectric cell. A light guiding wire 18 has adapters at each end, one of which fits the photoelectric cell and the other fits over the remaining eyepiece of the microscope 16.

In the photographing of gems it has been determined that peripheral light is desirable. Therefore in this embodiment the objector gem 10 is supported by a holder 20, whose structure and operation are likewise well known to those skilled in the art, above a light well 22 having a blackened base 24 and light transmitting wall 26. A light source 28 is suitably positioned adjacent the wall and energized through cord 30.

The camera adapter 14 has a cylindrical body, adapted to telescopically fit upon the cylnidrical eyepiece of the microscope after the lens 31 thereof is removed and has an internally threaded extension 32 thereon which screws onto the externally threaded lens holder 34 after the lens shade 36 is moved inwardly against spring 38. In practice, the only modification to the standard camera 16 is to externally thread lens holder 34 to adapt same for use in this combination.

The light wire 18 may be of any type of light-conducting material, one of the preferred types comprising an axially aligned bundle of fiberglass threads 40 within a suitable flexible tubing 42. One end of the wire terminates in an adapter 44 (see FIGURE 8). The adapter has a cylindrical body which telescopically fits on cylindrical extension 46 (see FIGURE 2) in the same manner as camera adapter 14. The remaining extremity of the light wire terminates in a similar adapter 48 which slips over the cylindrical protuberance 50 housing the photoelectric cell.

In operation, the object to be photographed is suitably supported in the binocular microscope and light 28 turned on. The microscope is then focused as is well known in the art.

Camera adapter 14 is screwed in place on lens holder 34 and adapter 44 positioned over the photoelectric cell housing 50. The lenses 31 of the microscope are removed and adapter 44 fitted over one eyepiece 46 and adapter 14 over the other. The camera shutter is then opened and after suitable film exposure, the photoelectric cell automatically closes same and the photograph is ready for developing.

While what hereinbefore has been described as the preferred embodiment of this invention, it is readily apparent that alterations and modifications can be resorted to without departing from the scope of this invention and such alterations and modificatoins are intended to be included within the scope of the appended claims.

I claim:

1. A device for magnifying and photographing objects comprising a binocular microscope supporting and illuminating the object to be photographed having a pair of eyepieces, an adapter fitting one eyepiece of said microscope, a camera secured to said adapter having a lens in light-communicating relationship with said adapter, said camera having a shutter and a photoelectric cell automatically operating said shutter, and a light-conducting conduit communicating said cell with the remaining eyepiece of said microscope.

2. A device for magnifying and photographing objects comprising a binocular microscope supporting and illuminating the object to be photographed having a pair of eyepieces, an adapter fitting one eyepiece of said microscope, a camera secured to said adapter having a lens in light-communicating relationship with said adapter, said camera having a shutter and a photoelectric cell automatically operating said shutter, and a light-conducting conduit communicating at one end with said cell and having an adapter at the opposite extremity fitting the remaining eyepiece of said microscope.

References Cited by the Examiner
UNITED STATES PATENTS 3,130,634   4/1964   Kropp et al. _____ 88—24

OTHER REFERENCES

Industrial Laboratories: "3–D Micrography Method Brings Realism to Research," Feb. 1954, pages 52–54.

NORTON ANSHER, *Primary Examiner.*

R. A. WINTERCORN, *Assistant Examiner.*